United States Patent
Matsumoto (10) Patent No.: US 8,333,637 B2
(45) Date of Patent: Dec. 18, 2012

(54) MANUFACTURING METHOD OF METAL MOLD AND RELECTION MIRROR FOR PROJECTION OPTICAL SYSTEM

(75) Inventor: Yasuhiro Matsumoto, Okazaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 716 days.

(21) Appl. No.: 12/515,406

(22) PCT Filed: Nov. 5, 2007

(86) PCT No.: PCT/JP2007/071483
§ 371 (c)(1),
(2), (4) Date: May 18, 2009

(87) PCT Pub. No.: WO2008/062655
PCT Pub. Date: May 29, 2008

(65) Prior Publication Data
US 2009/0256272 A1    Oct. 15, 2009

(30) Foreign Application Priority Data
Nov. 21, 2006    (JP) .................................. 2006-314038

(51) Int. Cl.
*B24B 1/00*    (2006.01)
(52) U.S. Cl. .......................................... 451/57; 451/28
(58) Field of Classification Search ................ 451/11, 451/28, 41, 57; 264/2.5
See application file for complete search history.

(56) References Cited

U.S. PATENT DOCUMENTS

| 7,793,403 | B2 * | 9/2010 | Matsumoto | 29/558 |
| 2002/0161418 | A1 * | 10/2002 | Wilkens et al. | 607/90 |
| 2005/0225855 | A1 * | 10/2005 | Doi | 359/457 |
| 2006/0244930 | A1 * | 11/2006 | Hayashi et al. | 353/97 |
| 2007/0009629 | A1 * | 1/2007 | Okumura et al. | 425/542 |

FOREIGN PATENT DOCUMENTS

| JP | 2000-263391 | 9/2000 |
| JP | 2006-35263 | 2/2006 |
| JP | 2006-194764 | 7/2006 |
| JP | 2006-250858 | 9/2006 |
| JP | 2006-308830 | 11/2006 |
| WO | WO 2006/033336 | 3/2006 |

* cited by examiner

*Primary Examiner* — Dung Van Nguyen
(74) *Attorney, Agent, or Firm* — Cozen O'Connor

(57) ABSTRACT

There are provided a method of manufacturing a metal mold suitable for forming, for example, a reflection mirror for a projection optical system and a reflection mirror for the projection optical system manufactured by the method thereof. The method includes a first process of cutting or grinding a metal mold material MM to trim the shape of the transfer optical surface and a second process of radiating the electron beam onto the transfer optical surface so as to perform smoothing process. By radiation of the electron beam, tool makes and the like created on the metal mold material MM in the first process can be erased so that the surface can be smoothed while maintaining the shape of the transfer optical surface.

2 Claims, 7 Drawing Sheets

MANUFACTURING METHOD OF METAL MOLD AND RELECTION MIRROR FOR PROJECTION OPTICAL SYSTEM

RELATED APPLICATIONS

This is a U.S. National Phase Application under 35 USC 371 of International Application PCT/JP2007/071483 filed on Nov. 5, 2007.

This application claims the priority of Japanese application no. 2006-314038 filed Nov. 21, 2006, the entire content of which is hereby incorporated by reference.

TECHNICAL FIELD

The present invention relates to a manufacturing technology of a metal mold, and in particular to a manufacturing method of the metal mold for forming a reflection mirror used in a projection optical system and to the reflection mirror manufactured by the method thereof for the projection optical system.

PRIOR ART

An optical element is generally required a high surface accuracy, and a reflection mirror of a projection optical system particularly used in a high resolution projection TV is required further particularity for the following reasons. Namely, on a metal mold surface to cast the reflection mirror by transferring has a minimal roughness or undulations having a cyclic nature caused by tool marks created indispensably by machining. If a high resolution image is projected with the reflection mirror on which the tool marks are transferred, there is a possibility to cause image defects such as ghosts and moire. As high vision broadcasting and optical discs having a high recording density become popular, there is a tendency that the image defects become conspicuous. The reflection mirror used in the above application is required a redundancy to exert an appropriate imaging performance for images at any wavelengths and frequencies so as to reproduce various kinds of contents including movie films. Therefore, the metal mold to cast the reflection mirror of the projection optical system by transferring is subject to grinding after machining for a smoothing process. However, in the forgoing, an emerging undulation due to deterioration of shape accuracy was not able to sufficiently be removed in the element such as the reflection mirror of the projection optical system which requires a surface shape having a high accuracy. Further, there was a problem that the smoothing process by grinding itself is time consuming in the manufacturing process.

Patent document 1: unexamined Japanese patent application publication No. 2006-35263

DISCLOSURE OF THE INVENTION

Problems to be Solved by the Invention

Also, in the Patent Document 1, there is disclosed a method to shorten the manufacturing time through a technology of smoothing by radiating an electron beam onto an object to be processed. However, the above technology relates to metal molds for plastic parts or for semiconductor parts which only require a surface roughness of about 1 μm, and is not appropriate for casting the mirror surface such as the reflection mirror of the projection optical system which requires a high resolution in nano order since a technical issue that the "undulation" is generated by deteriorating the shape accuracy is not considered.

As the result of intensive study, inventors of the present invention have found that "undulation" caused by the aforesaid deterioration of the shape accuracy, generated in a conventional manufacturing method of the metal mold which requires a highly accurate surface shape such as the reflection mirror for the projection optical system, closely relates to a PSD function which describes a surface state of a surface formed by cutting or grinding process representing one of manufacturing processes.

Namely, the present invention has one aspect to resolve the above specific problem of the projection optical system and an object the present invention is to provide a manufacturing method of a transfer metal mold preferable for casting a reflection mirror having a high surface accuracy wherein deterioration of shape is suppressed, and a reflection mirror obtained through the manufacturing method thereof.

Means to Resolved the Problem (1) A manufacturing method of a transfer casting metal mold to form an optical surface of a reflection mirror used in a projection optical system by transfer casting, having: a first process to form a transfer optical surface by cutting or grinding a metal material; wherein a power spectrum density function (hereinafter PSD function=$A/f^B$) describing a surface status of the transfer optical surface processed by the first process satisfies that:

$$1\times10^{-8} \leq A \leq 1\times10^{-6} \tag{1}$$

$$1/1000 < f < 1 \tag{2}$$

$$1 < B < 3 \tag{3}$$

wherein,
A: constant ($\mu m^{3-B}$)
f: Space frequency ($\mu m^{-1}$) of surface roughness
B: exponential of space frequency (2) The manufacturing method of a transfer casting metal mold of item (1), further having: a second process to perform a smoothing process by polishing the transfer optical surface after the first process.

(3) The manufacturing method of a transfer casting metal mold of item (1), further having: a second process to perform a smoothing process by radiating energy beam onto the transfer optical surface after the first process.

According to the present invention, since the present invention has the second process to perform the smoothing process by radiating the energy beam onto the transfer optical surface after the first process, the tool marks on the metal mold material created by the first process can be erased by radiating the energy beam, and the smoothing can be realized while maintaining the shape of the transfer optical surface. Meanwhile, the "energy beam" means an electron beam, an ion beam, a laser bema and the like.

(4) The manufacturing method of a transfer casting metal mold of item (2) OR (3), wherein the PSD function of the transfer optical surface smoothed by the second process satisfies the formula that $1\times10^{-8} \leq A \leq 1\times10^{-7}$ … (4) and a maximum value of one of undulation in the PSD function is smaller that a twice value of the minimum value thereof.

According to the present invention, by setting A in the rage shown by the formula (4), the working time can be shortened compared to a case where A falls below the lower limit of the range. Also compared to a case where A exceeds the upper limit of the rage, deterioration of the surface shape of the transfer optical surface is further suppressed, and a metal mold having a highly accurate surface shape can be obtained. Meanwhile, the PSD function is explained in JIS B0090-8.

(5) An reflection mirror for projection optical system having an optical surface cast by the transfer casting metal mold formed by the manufacturing method of a transfer casting metal mold of claim 4, wherein the PSD function of the optical surface is within a range of the formula (4).

Generally, a mirror surface is described by rms roughness, however, optical performances may be effected differently though the mirror surfaces have the same rms roughness. A working method, where the tool marks and the undulation tend to occur regularly in a lateral direction (or a longitudinal direction) on the mirror surface, requires special attention. The PSD function is a frequency spectrum of roughness which can describe cyclic nature and amplitude of the frequency. In the projection optical system, even if the rms roughness is large, it may not be a problem without the cyclic nature. Thus is preferred to use the PSD function to define the surface.

While a roughness meter is used to measure the roughness of the mirror surface, the above accuracy level of roughness often cannot be measured by a contact type roughness meter since it will create measuring scratches. Therefore, a roughness meter having an optical resolution of 0.1 nm is preferably used. The measurement data is subject to fast Fourier transformation to obtain a power spectrum, and a power spectrum density is calculated by dividing the power spectrum by the frequency amplitude so as to obtain the PSD function. "One undulation in the PSD function" means an undulation of the power spectrum density.

Effect of the Invention

According to the present invention, there are provided a manufacturing method of a metal mold preferable for casting, for example, a reflection mirror for a projection optical system and the reflection mirror for the projection optical system manufactured by the method thereof.

DESCRIPTION OF THE SYMBOLS

Figure 1:
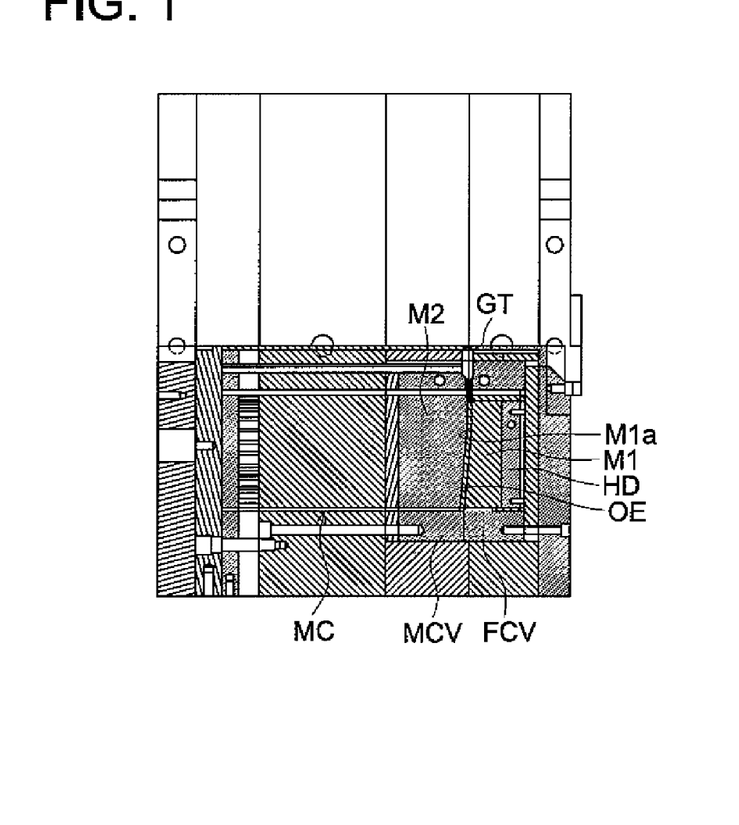
FIG. 1 is a cross-sectional view showing a state where a transfer metal mold of the present embodiment is fixed on a die set.

BS Base
EG Electron gun
EL Electron lens
FCV Fixed side cavity
GT Gate
HD Holding section
HS Housing
LS Lens
M1 Transfer metal mold
M1a Optical surface transfer surface
M2 Transfer metal mold
MC Moving core
MCV Moving side cavity
MM Metal mold material
MR Mirror
OE Optical element
OP Optical surface
R Tool rotating radius
RS Main axis
SP Spindle section
TL Tool
TT Table
TX X axis table
TY Y axis table
TZ Z axis table Description Of The Preferred Embodiments An embodiment of the present invention will be described with reference to the drawings. FIG. 1 is a cross-sectional view showing a state where a transfer casting metal mold of the present embodiment is fixed on a die set. A holding section HD to hold the transfer metal mold M1 having an optical surface transfer surface M1a which is a free-form surface is fixed on a surface of a fixed side cavity FCV. A transfer casting metal mold M2 configured with nickel disposed to face the transfer casting metal mold M1 can move relatively in a left and right direction integrally with a movable core MC in a movable side cavity MCV. Melted resin is injected into a space enclosed by the transfer casting metal molds M1 and M2 from an outside via a gate GT and solidified in a state where the movable core is pressed to a right direction. Whereby, an optical element OE is caste. An optical surface of the optical element OE is formed in a state of a mirror surface with a high accuracy by the optical surface transfer surface of the transfer casting metal mold M1. Thereafter, by applying coating, the optical element OE is formed to be a reflection mirror or a lens of, for example, the projection optical system.

Figure 2A:
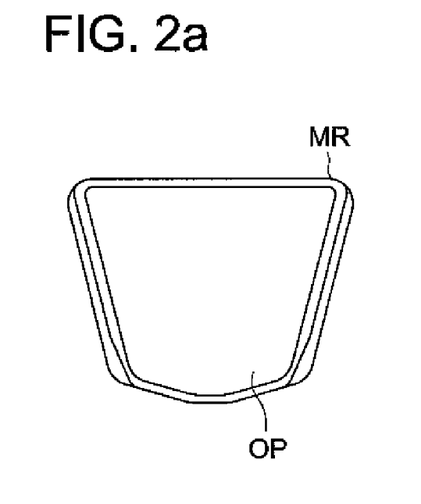
FIG. 2(a) is a front view showing an example of a reflection mirror MR for a projection optical system.
Figure 2B:
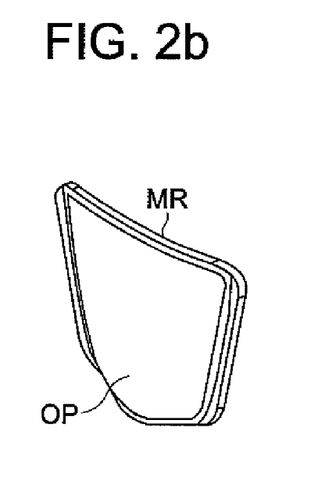
FIG. 2(b) is a perspective view of the refection mirror thereof.
Figure 3:
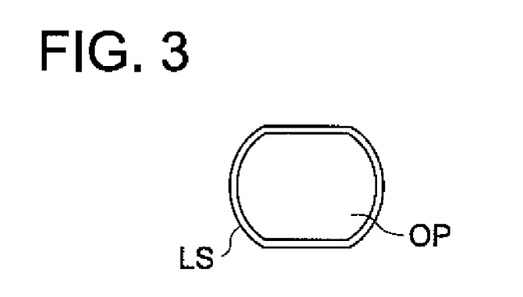
FIG. 3 is a front view showing an example of a lens LS.

FIG. 2(a) is a front view showing an example of a reflection mirror MR for a projection optical system, and FIG. 2(b) is a perspective view of the refection mirror thereof. FIG. 3 is a front view showing a lens LS representing an example of an optical element. Either of optical elements has the optical surfaces OP which is the free-form surfaces transferred and caste by the optical surface transfer surface M1a of the transfer casting metal mold M1.

Figure 4:
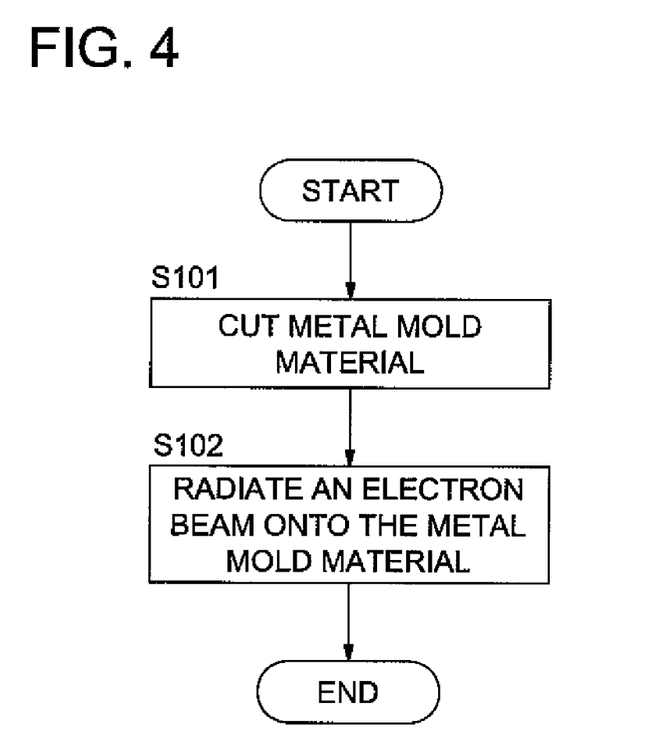
FIG. 4 is a flow chart showing a manufacturing method of the transfer metal mold of the present embodiment.

FIG. 4 is a flow chart showing a manufacturing method of the transfer casting metal mold of the present embodiment. According to the manufacturing method of transfer casting metal mold related to the present embodiment, cutting work (first process) is performed on the material of the metal mold in step S101, then after the transfer optical surface is formed by cutting in a desired shape, the electron beam is radiated onto the transfer optical surface formed (second process) so as to smooth the surface. While the electron beam is radiated in the second process for smoothing in the present invention, an ion beam or a laser beam can be radiated without being limited to the electron beam. Further, instead of the smoothing process by beam radiation, a smoothing process by grinding can accomplish a predetermined surface shape which satisfies the PSD function in the first process, whereby an effect of the present invention can be obtained though some time loss occurs. Further, the first process can be grinding work.

Figure 5:
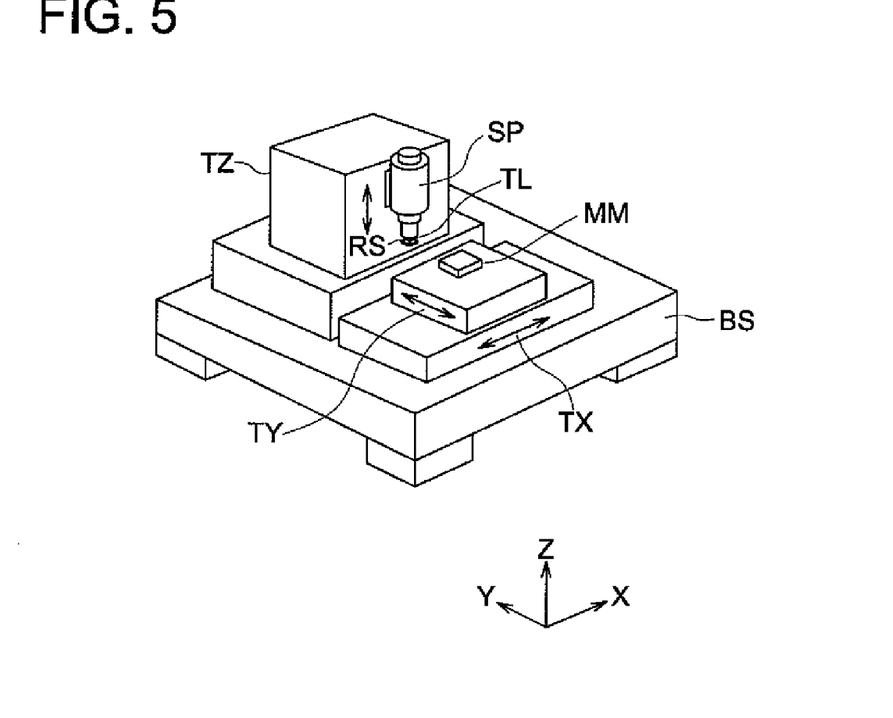
FIG. 5 is a perspective view of an ultra precision lathe to perform cutting work on a material of the metal mold preferable to be used in a first process.
Figure 6:
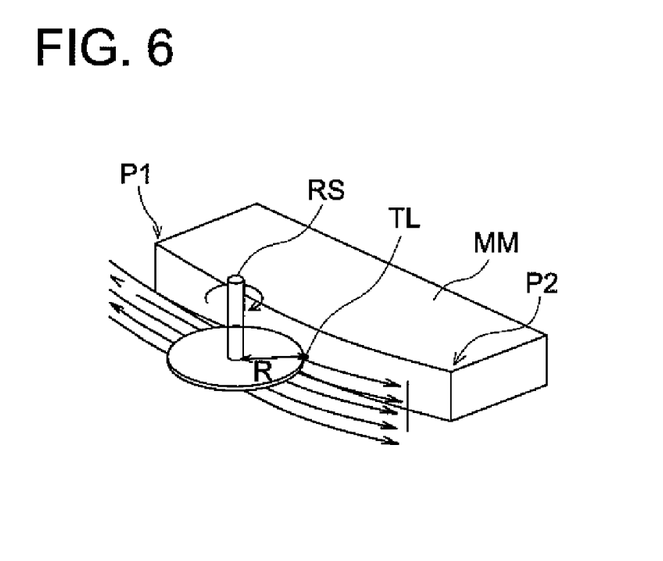
FIG. 6 is a perspective view showing a vicinity of a tool in cutting work.

FIG. 5 is a perspective view of an ultraprecision lathe to perform cutting work on a material of the metal mold preferable to be used in a first process. FIG. 6 is a perspective view showing a vicinity of a tool in cutting work. The ultraprecision lathe used in cutting work on the material MM of the metal mold will be described as follow.

As FIG. 5 shows, an ultraprecision work machine 100 is provided with a base BS fixed on a machine platen, a X axis table TX disposed movably in a x direction in respect to the base BS, a Y axis table TY disposed movably in a Y direction I respect to the X axis table TX, a Z axis table TZ disposed movably in a Z direction in respect to the base BS, and a spindle section SP supported by the Z axis table TZ. On the spindle section SP, a main shaft RS equipped with a tool TL having a tool rotation radius R is supported to be driven rotatably. While the spindle section SP rotates the tool TL, by moving each table, the tool TL is brought to be in contact with the material MM of the metal mold in order to perform cutting work.

More specifically, as FIG. 6 shows, while cutting a surface of the material MM of the metal mold by rotating the tool TL, the X axis table XT and the Y axis table TY are moved along a desired free-form surface to be formed so that the tool TL relatively moves from an end P1 of the material MM of the metal mold to another end of P2 as an arrow shows. When the toll TL reaches to the other end P2, the tool TL is moved by one step (pick feed) in the Z axis direction then the tool TL further moves relatively from the end P2 to the end P1 of the metal mold material MM which is called fly cutting. As above, by repeating cutting one line by one line, the transfer optical surface can be formed. The following are typical conditions of cutting work.

Number of rotation of the main shaft: 20000 rpm
    Feeding speed of the material: 400 mm/min
    Radius of tool nose: 10 mm
    Tool rotation radius R: 11 mm
    Amount of pick feed: 0.02 mm In the above forming of the transfer optical surface, minimal tool marks and undulations along the arrows in FIG. 6 are formed on the surface thereof. The tool marks and the undulations formed are transferred onto the refection surface of the reflection mirror MR and cause image defects. Then, the tool marks and the undulations are removed by the following second process.

Figure 7:
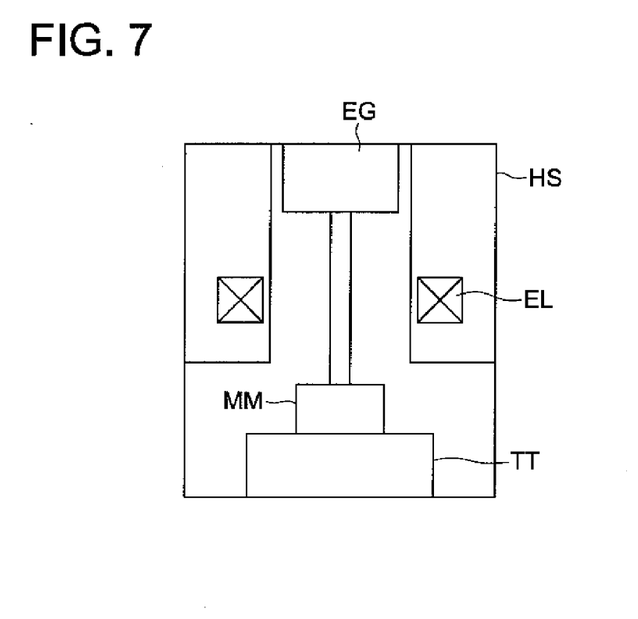
FIG. 7 is a schematic cross-sectional view an electron beam radiation apparatus to radiate an electron beam onto the material of the metal mold preferable to be used in a second process.

FIG. 7 is a schematic cross-sectional view of an electron beam radiation apparatus to radiate an electron beam onto the metal mold material preferable to be used in a first process. The electron beam radiation apparatus forms an electron beam probe so as to radiate the material MM by scanning at a high speed, which is configured with an electron gun including a cathode and an anode to form the electron beam and to radiate the beam onto a target, an electric lens to control a focus position of the electron beam in respect to the metal mold material MM, a table TT movable in a direction perpendicular to the beam axis to carry the metal mold material MM. Meanwhile, the above sections are disposed in a housing HS to be maintained in a vacuum condition while the electron beam is emitted. Since the electron beam radiation apparatus is disclosed, for example, in unexamined Japanese patent application publication No. 2006-35263, detailed description is omitted.

The table TT is driven so that the electron beam emitted from the electron gun EG radiates the transfer surface entirely. Typical working conditions are shown as follow.

Cathode voltage: 5 to 10 kV
    Anode voltage: 5 kV
    Solenoid voltage: 0.3 to 0.5 kV
    Degree of vacuum: 0.04 Pa
    Radiation time: 1 to 6 sec.

By radiating the above electro beam, minimal steps of the tool marks on the transfer optical surface melt and the smoothing process of the surface is carried out. Meanwhile, as a finishing process after radiation of the electron beam, manual grinding can be carried out at the discretion.

Figure 8:
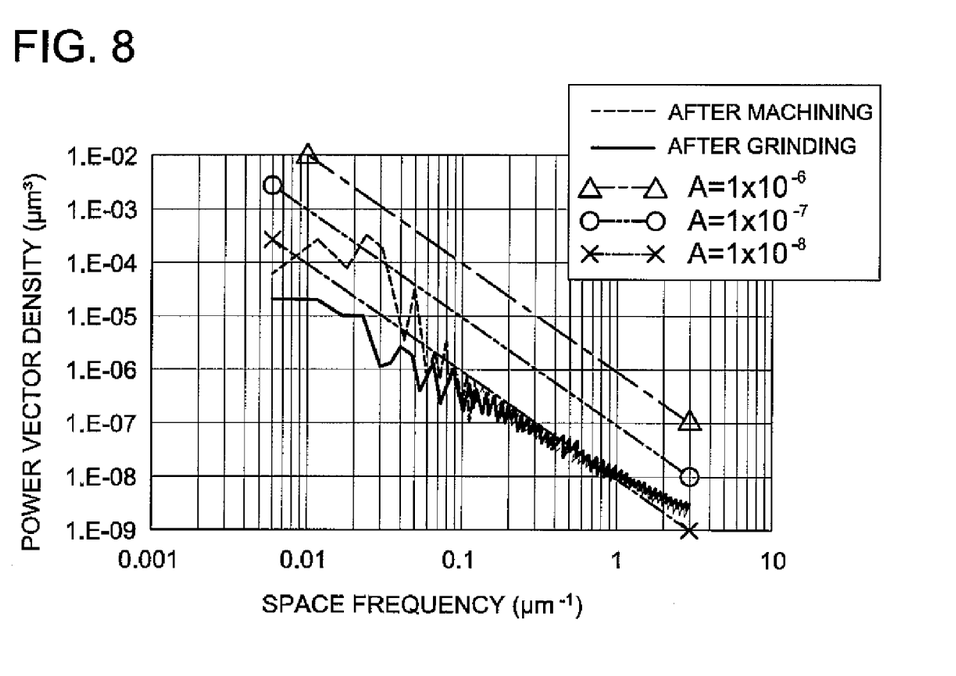
FIG. 8 is a graph of PSD function (B=2) showing a roughness of a transition optical surface
Figure 9:
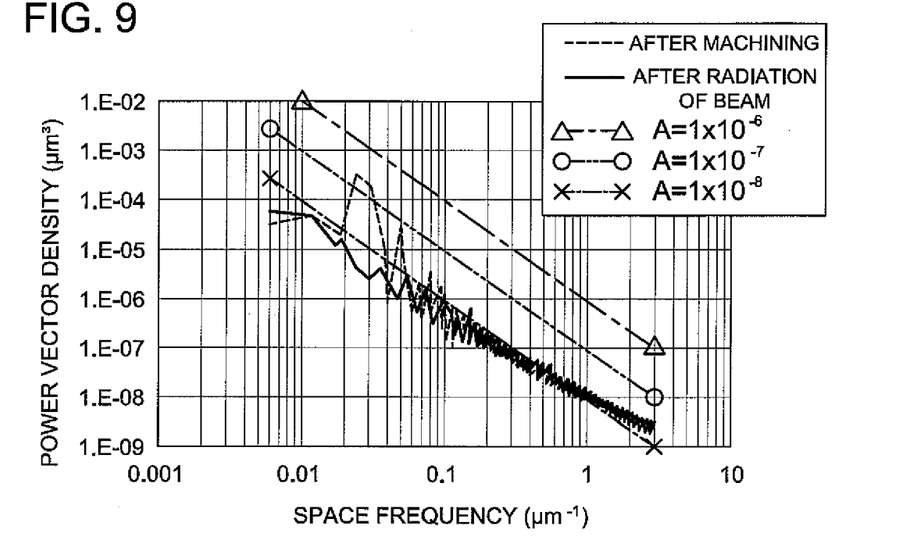
FIG. 9 is a graph of PSD function (B=2) showing a roughness of a transition optical surface

FIG. 8 and FIG. 9 are graphs of the PSD functions showing roughness of the transfer optical surfaces where a vertical axis shows a power spectral density and a horizontal axis shows a space frequency. PSD function is shown by $A/f^B$ where:

A: Constant ($\mu m^{3-B}$)
    F: Space frequency of surface roughness ($\mu m^{-1}$: $1/1000 < f < 1$)
    B: Exponent of space frequency ($1 < B < 3$)

FIG. 9 shows a case where the electron beam is radiated for six seconds after machining. It is revealed that by radiating the electron beam for only six seconds, the surface can be smoothed in a level of about $A = 1 \times 10^{-8}$. Contrarily, as FIG. 8 shows, to obtain the same level of the mirror surface as FIG. 9, two hours are required for grinding. Therefore, it is recognized that manufacturing time of the metal mold is prolonged. Meanwhile, even in case manual grinding is performed after radiation of the electron beam, the required time can be significantly reduced.

Meanwhile, the vertical axes in FIG. 8 and FIG. 9 describe exponents of 10 (for example, $1.0 \times 10^{-03}$) using E (for example, 1.E-3).

Meanwhile, by radiating the electron beam in a large amount, the irradiated surface can be smoothed, however there is a possibility that the transfer optical surface deforms and the highly accurate reflection mirror cannot be cast by transferring. On the other hand, by reducing the amount of pick feed to suppress the tool marks in cutting work, the amount of the electron beam can be reduced, however there is a problem that cutting work time is prolonged. Therefore, in the present embodiment, a balance of the working time and the surface roughness is maintained as follow.

More specifically, when the surface condition of the transfer optical surface of the metal mold material MM processed by cutting work is described by the PSD function $(=A/f^B)$, it is preferred that the following formula is satisfied.

$$1 \times 10^{-8} \leq A \leq 1 \times 10^{-6} \quad (1)$$

First, the transfer optical surface of the metal mold material MM is cut or grinded so that the roughness becomes not less than the lower limit of the formula (1), therefore working time is short. On the other hand, the transfer optical surface of the metal mold material MM is cut or grinded so that the roughness becomes not more than the upper limit of the formula (1), therefore the mirror surface can be realized with relatively small amount or short time of the electron beam radiation and there is less possibility that the shape of the transfer optical surface is deformed.

Further, it is more preferable that the PSD function of the transfer optical surface of the metal mold material MM processed by cutting satisfies the formula (4), and a maximum value of one of the undulations in the PSD function is smaller than twice the value of a minimum value thereof. The undulation can be measured with an interferometer (microscope) of Veeco Instrument (Trade name: WYKO HD3300) through a phase shift method.

$$1 \times 10^{-8} \leq A \leq 1 \times 10^{-7} \quad (4)$$

Figure 10:
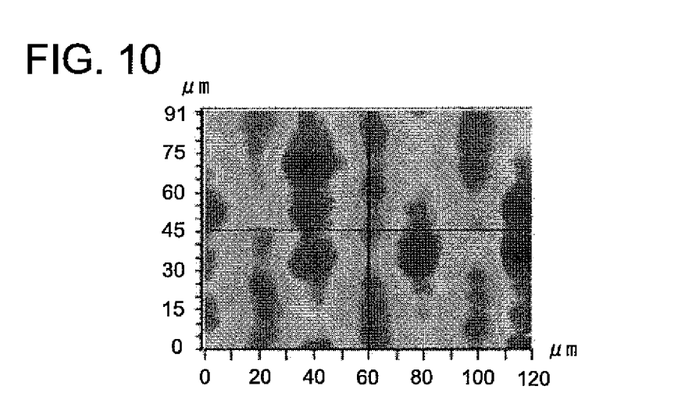
FIG. 10 is a photograph of a transition optical surface of a material MM of a metal mold which is processed by cutting work through the ultraprecision working machine shown in FIG. 5, observed through an interferometer.
Figure 11:
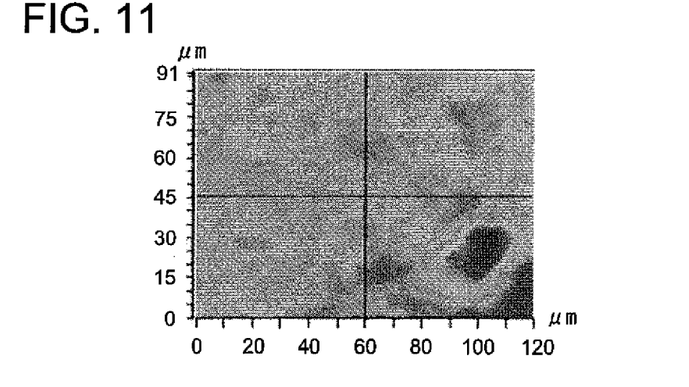
FIG. 11 is a photograph of a transition optical surface of a material MM of a metal mold which is irradiated by an electron beam through the electron beam radiation apparatus shown in FIG. 7 observed through an interferometer.

FIG. 10 is a photograph of a transfer optical surface of the metal mold material MM cut by the ultraprecision machine shown in FIG. 5, observed with the interferometer. FIG. 11 is a photograph of a transfer optical surface of the metal mold material MM irradiated by the electron beam with an electron beam radiation apparatus shown in FIG. 7, observed with the interferometer. It is obvious in the comparison of FIG. 10 and FIG. 11, that the tool marks remain on the transfer optical surface by only cutting work, contrarily the tool marks disappear by radiating the electron beam.

Figure 12:
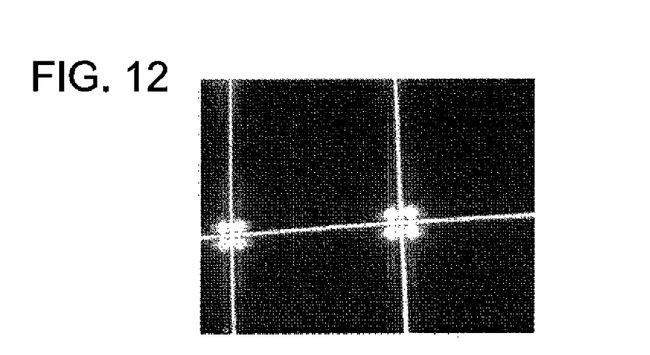
FIG. 12 is a photograph showing a projected imaged through a reflection mirror caste by transferring through the metal mold shown in FIG. 8.

FIG. 12 is a photograph showing a projected image of the reflection mirror cast through transfer casting by a metal mold formed by cutting work only shown in FIG. 10.

Figure 13:
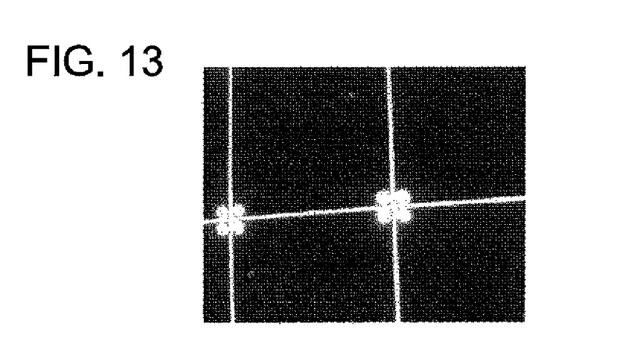
FIG. 13 is a photograph showing a projected imaged through a reflection mirror formed by transferring through the metal mold shown in FIG. 8.

FIG. 13 is a photograph showing a projected image of the reflection mirror cast through transfer casting with a metal mold which is irradiated by the electron beam. It is obvious in the comparison of FIG. 12 and FIG. 13 that a ghost occurs on the reflection mirror cast through transfer casting with the metal mold formed by cutting work only, contrarily the ghost does not occur on the reflection mirror cast through transfer casting with the metal mold which is irradiated by the electron beam and a superior mirror surface is formed.

In the forgoing, while the examples to perform the smoothing process by radiating the electron beam in the second process have been shown, manual grinding can be carried out in the second process without being limited to electron beam radiation.

Figure 14:
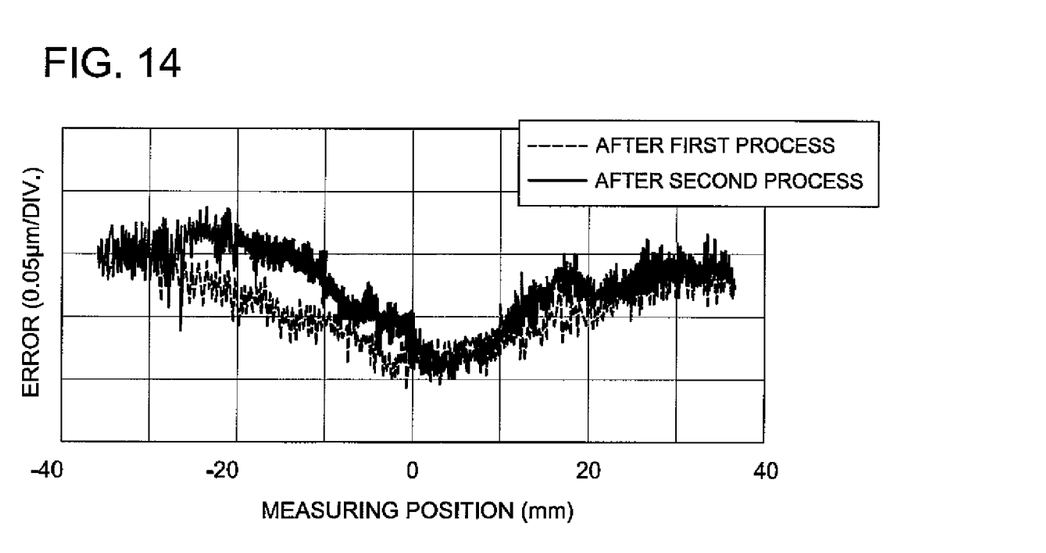
FIG. 14 is a graph showing a shape of a transition optical surface of a metal mold which is formed by cutting work under a condition to satisfy a formula (1) in a first process and further by manual grinding (a second process).

A graph shown in FIG. 14 shows a measurement result of a shape of a transfer optical surface measured through a three dimension measuring machine (Ua3P: Matsushita Electric Co., Ltd.), wherein the shape of the transfer optical surface is in a state where cutting work is carried out with a condition $(A=1 \times 10^{-7})$ to satisfy formula (1) in a first process and manual grinding is further carried out with a condition of $A=1 \times 10^{-8}$ in the second process. A graph shown in FIG. 15 shows a measurement result of the shape of the transfer optical surface measured through the same three dimension measuring machine, wherein the shape of the transfer optical surface is in a state wherein cutting work is carried out with a condition $(A=1 \times 10^{-5})$ which does not satisfy the formula (1) in the first process and manual grinding is further carried out so that $A=1 \times 10^{-8}$ in the second process.

Figure 15:
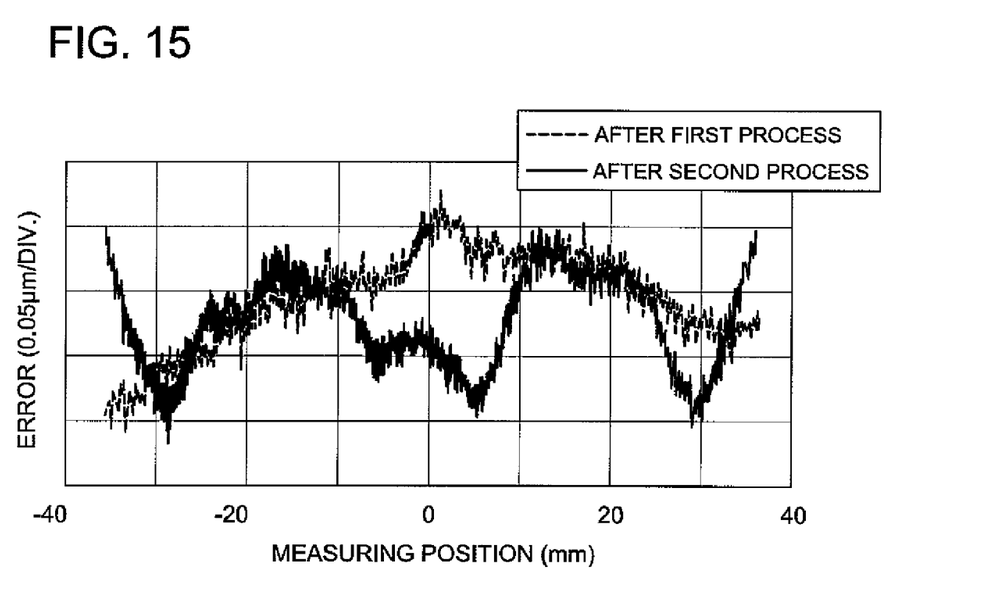
FIG. 15 is a graph showing a shape of a transition optical surface of a metal mold which is formed by cutting work under a condition not to satisfy a formula (1) in a first process and further by manual grinding (a second process).

It is obvious in the comparison of FIG. 14 and FIG. 15. In an example shown by FIG. 15, since shape accuracy is deteriorated by the second process (also grinding time is increased), if the reflection mirror is formed by using the metal mold thereof, a resolution of the projected image is affected. Contrarily, according to the example of FIG. 14, deterioration of the shape accuracy can be suppressed even if the manual grinding is carried out in the second process.

As above, the present invention has been described with reference to the embodiments without being limited to the embodiments thereof and it is to be understood that changes and variations may be made without departing from the spirit or scope of the appended claims. For example, machining before radiating the electron beam is not limited to fly cutting, grinding, shaping and polishing are possible.

What is claimed is:

1. A manufacturing method of a transfer casting metal mold to cast an optical surface of a reflection mirror used in a projection optical system by transfer casting, comprising:
    forming a transfer optical surface by cutting or grinding a metal material in a first process; and
    performing a smoothing process in a second process by radiating an energy beam onto the transfer optical surface after the first process,
    wherein a power spectrum density function (hereinafter called a PSD function $=A/f^B$) describing a surface status of the transfer optical surface processed by the first process satisfies that:

$$1 \times 10^{-8} \leq A \leq 1 \times 10^{-6} \quad (1)$$

$$1/1000 < f < 1 \quad (2)$$

$$1 < B < 3 \quad (3)$$

wherein, A denotes a constant ($\mu m^{3-B}$), f denotes a space frequency ($\mu m^{-1}$) of surface roughness and B denotes an exponent of the space frequency.

2. The manufacturing method of the transfer casting metal mold of claim 1, wherein the PSD function of the transfer optical surface smoothed by the second process satisfies the formula that $1 \times 10^{-8} \leq A \leq 1 \times 10^{-7} \ldots$ (4) and a maximum value of one of undulations is smaller than a twice the value of a minimum value thereof in the PSD function.

* * * * *